United States Patent
Lepage (10) Patent No.: US 11,507,893 B2
(45) Date of Patent: Nov. 22, 2022

(54) METHOD FOR EXPLOITING CHARGING STATIONS

(71) Applicant: ALL IN FACTORY, Saclas (FR)

(72) Inventor: Marc Lepage, Saclas (FR)

(73) Assignee: ALL IN FACTORY, Saclas (FR)

( * ) Notice: Subject to any disclaimer, the term of this patent is extended or adjusted under 35 U.S.C. 154(b) by 425 days.

(21) Appl. No.: 16/629,762

(22) PCT Filed: Jul. 13, 2018

(86) PCT No.: PCT/EP2018/069102
§ 371 (c)(1),
(2) Date: Jan. 9, 2020

(87) PCT Pub. No.: WO2019/012115
PCT Pub. Date: Jan. 17, 2019

(65) Prior Publication Data
US 2020/0226499 A1    Jul. 16, 2020

(30) Foreign Application Priority Data

Jul. 13, 2017   (FR) ..................... 1756669

(51) Int. Cl.
*H02J 7/00*    (2006.01)
*G06Q 10/02*   (2012.01)
(Continued)

(52) U.S. Cl.
CPC .............. *G06Q 10/02* (2013.01); *B60L 53/16* (2019.02); *B60L 53/305* (2019.02); *B60L 53/62* (2019.02);
(Continued)

(58) Field of Classification Search
USPC ........................................................ 320/109
See application file for complete search history.

(56) References Cited

U.S. PATENT DOCUMENTS

| 2009/0082957 A1* | 3/2009 | Agassi | B60L 53/80 |
| | | | 701/532 |
| 2016/0065269 A1 | 3/2016 | Yazaki | |
| 2016/0284143 A1* | 9/2016 | Outwater | H04M 1/72412 |

FOREIGN PATENT DOCUMENTS

| CN | 103249073 A | 8/2013 |
| CN | 103249074 A | 8/2013 |

(Continued)

OTHER PUBLICATIONS

International Search Report from corresponding International Application PCT/EP2018/069102 dated Oct. 26, 2018, 7 pages.
(Continued)

*Primary Examiner* — Samuel Berhanu
(74) *Attorney, Agent, or Firm* — Ronald M. Kachmarik; Cooper Legal Group LLC (57) ABSTRACT

Method for exploiting a network of electrical charging stations for motor vehicles. The method includes (a) a step in which a station is reserved via a reservation center and the center transmits to the vehicle a response comprising access data providing access to the station, and (b) a step in which, when the vehicle is less than 100 meters from the station, the vehicle requests access to the station and the station provides access to the electrical power available via a socket of the station. In step (b), the communication between the vehicle and the station is a local electromagnetic communication, preferably at a frequency comprised between 2400 and 2500 MHz.

13 Claims, 2 Drawing Sheets

(51) Int. Cl.
    *B60L 53/62*           (2019.01)
    *B60L 53/66*           (2019.01)
    *B60L 53/30*           (2019.01)
    *B60L 53/16*           (2019.01)
    *B60L 53/65*           (2019.01)
    *G06Q 10/06*          (2012.01)

(52) U.S. Cl.
    CPC ............... *B60L 53/65* (2019.02); *B60L 53/66* (2019.02); *G06Q 10/06312* (2013.01); *G06Q 10/06314* (2013.01); *G06Q 2240/00* (2013.01)

(56) References Cited

FOREIGN PATENT DOCUMENTS

| | | |
|---|---|---|
| CN | 203864631 U | 10/2014 |
| CN | 104852978 A | 8/2015 |
| FR | 2968810 A1 | 6/2012 |

OTHER PUBLICATIONS

Chinese Search Report, from Corresponding Chinese Application No. 201880059805.X, dated Jun. 2, 2022.

\* cited by examiner

METHOD FOR EXPLOITING CHARGING STATIONS

TECHNICAL FIELD

The invention relates to a method for exploiting a network of charging stations intended to recharge a set of electric vehicles. The invention also relates to a charging station suitable for implementing a method according to the invention.

PRIOR ART

The development of electric vehicles is limited by current difficulties with recharging the batteries of vehicles. In particular, the driver of an electric vehicle is never certain that the will be able to access a charging station when he is making a long journey.

To attempt to solve this problem, Internet sites provide the addresses of electrical charging stations. The number of referenced stations is however limited. Furthermore, the driver never knows whether the charging station that he has the intention of using will be available at the desired time.

Lastly, in "un-served" zones not covered by a GSM cell phone network, the driver may encounter difficulties when attempting to reserve a station.

There is therefore a need for an at least partial solution to these problems.

One objective of the invention is to meet this need.

SUMMARY OF THE INVENTION

The invention proposes a method for exploiting a network of stations intended to recharge with electrical power a set of motor vehicles, the method comprising the following successive steps:
a) a step in which a reservation is made, with the vehicle, via a reservation center, preferably by means of a cell phone network, by carrying out the following steps:
  a1) a step in which the vehicle makes a request, to the center, to reserve said station, the reservation request setting constraints;
  a2) a step in which the center checks, in a schedule, the availability of a station meeting said constraints;
  a3) if a station meeting the constraints is available, a step in which the center transmits, to the vehicle, a positive response comprising access data that permit access to the station, updates the schedule and records the access data in a memory of the vehicle; otherwise preferably, the center transmits, to the vehicle, a negative response to the reservation request;
b) if the vehicle has received a positive response to the reservation request, when the vehicle is less than 100 m, preferably less than 50 m, or even less than 10 m from the station, a step in which the vehicle requests access to the station, the access request comprising the following successive steps:
  b1) a step in which the vehicle transmits the access data to the station;
  b2) a step in which the station checks the access data;
  b3) if the access data are valid, a step in which the station provides access to the electrical power available via a socket of the station; otherwise preferably, the station transmits an access denial to the vehicle;
c) preferably, at the end of charging, a step in which the station transmits charging data to the vehicle, and in which the charging data are stored in the memory of the vehicle;
d) preferably, a step in which charging data are transmitted from the vehicle to the center.

Noteworthily, the communication between the vehicle and the station in step b) and preferably in step c) is a local electromagnetic communication, i.e. one that is possible only when the vehicle is in proximity to the station, for example less than 100 m, preferably less than 50 m, or even less than 10 m from the station.

A local electromagnetic communication allows direct communication between the station and the vehicle, no relay of the transmission being required. Generally, it does not require a subscription. The local electromagnetic communication is preferably a Bluetooth® communication.

Advantageously, the communication between the vehicle and the station is therefore possible even when the station is located in an un-served zone, for example in an underground parking lot or in an isolated region.

The method furthermore allows the schedule of the center to be updated via conventional wireless radiophonic means once the vehicle returns to a zone permitting such a communication, for example when it exits from the underground parking lot.

The method may in particular further comprise one or more of the following optional features:
  the local electromagnetic communication is at a frequency comprised between 2400 and 2500 MHz;
  the local electromagnetic communication is a Bluetooth® communication;
  in step a), the reservation of the station via the reservation center is carried out by means of a cell phone network;
  the station is located in an un-served zone not covered by a cell phone network;
  the network of stations comprises more than 5000 stations;
  in step a), the identification of a station to satisfy the reservation request depends
    on a constraint relating to the geographical location of the station, and
    on a constraint relating to the time at which the battery of the vehicle is to be recharged;
  the identification of a station to satisfy the reservation request further depends
    on a constraint relating to a level of charge that the batteries of the vehicle will have at the time at which the center believes the vehicle will arrive at the station, and/or
    a constraint relating to a level of charge requested by the vehicle at the end of the recharging;
  in step a), if the center is unable to find a station satisfying the reservation request, the center proposes modifications to at least one constraint set by the reservation request;
  the center generates an access code on each reservation request, and the station is configured to inspect the validity of the access code received from the vehicle;
  the center informs the vehicle of other requests to reserve the station reserved by the vehicle.

The invention also relates to an electrical charging station comprising:
  a socket suitable for delivering electrical power to an electric vehicle;
  a casing that is fastened with respect to the ground, and preferably fastened to the ground;

a holder in or into which the socket is fastened or integrated, said holder being movable with respect to the casing;

a control module for controlling the position of the holder with respect to the casing, the holder being movable between a protected position and an exposed position, in which positions access to the socket, from outside the casing, is prevented and permitted, respectively.

The station may in particular furthermore comprise one or more of the following optional features:

- the casing comprises an aperture that is blocked in the protected position and that defines an access to the socket in the exposed position;
- the holder is movable in the casing between the protected and exposed positions;
- the holder is arranged so as to block the aperture in the exposed position;
- the holder is rotationally movable, in the casing, about an axis X, between the protected and exposed positions;
- the holder is arranged so as to block the aperture whatever the angular position of the holder with respect to the casing;
- in protected position, the socket is separated from the exterior environment by a shield for protecting against shocks;
- the shield lies, at least partially, opposite the socket with respect to the axis X of rotation of the holder;
- in the protected position, the socket is separated from the exterior surface of the casing, i.e. the surface which is exposed to the environment when the casing is fastened to the wall or to the ground, by a distance larger than 2 cm, and preferably larger than 5 cm;
- the control module comprises a transceiver able to communicate via Bluetooth®;
- the station comprises an image-acquiring apparatus controlled by the control module;
- the image-acquiring apparatus is fastened to the holder, the control module being configured to control the driving means so as to move the acquiring apparatus between an acquiring position and a stowed position in which the objective of the acquiring apparatus is exposed to and isolated from the environment outside the casing, respectively.

BRIEF DESCRIPTION OF THE FIGURES

Other features and advantages of the invention will become more apparent on reading the following detailed description and on detailed examination of the drawings, in which:

FIG. 2 schematically illustrates, in perspective, a station according to the invention in a protected position (FIGS. 2a and 2b), in an acquiring position of an image-acquiring apparatus (FIGS. 2c and 2d) and in an exposed position (FIGS. 2e and 2f).

DEFINITIONS

Unless otherwise indicated, "to comprise", "to include" or "to have" must be interpreted in a broadened nonlimiting manner By "vehicle" what is meant here is the drivable machine, but also the content thereof. When the driver is on board, his cell phone is therefore considered to form part of the vehicle.

The drivable vehicle may not only be a light vehicle, such as an automobile, a scooter or a motorcycle, but also an industrial vehicle, this in particular including trucks, public-transport vehicles and agricultural vehicles.

DETAILED DESCRIPTION

Method

Figure 1:
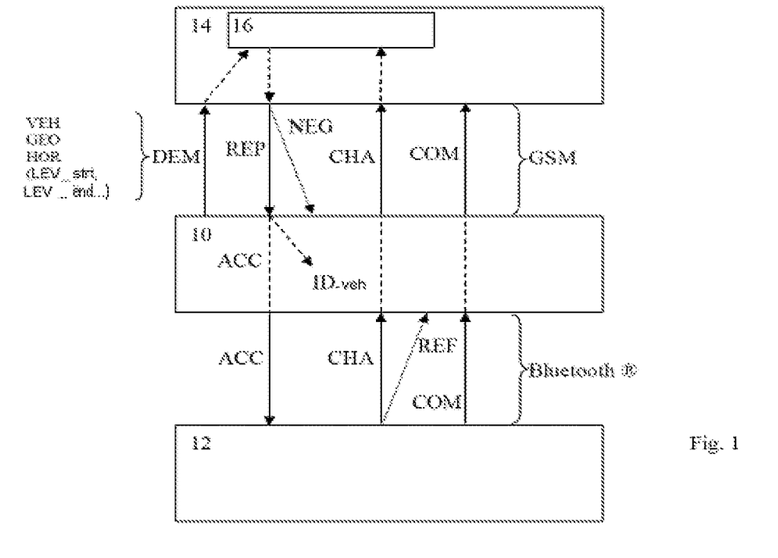
FIG. 1 schematically shows a system in which a method according to the invention may be implemented.

The fleet comprises a plurality of vehicles 10, preferably more than 500, preferably more than 1000, and preferably more than 10 000 vehicles, capable of recharging at a plurality of charging stations 12 dispersed over a territory, and preferably more than 500, preferably more than 1000, preferably more than 5000, and more preferably more than 10 000 stations. In particular, the stations 12 may be stations installed in individual homes, in un-served zones, or in underground parking lots inaccessible to the cell phone network.

In step a), the vehicle 10 makes a request to reserve access to the station 12 to a reservation center 14, which is common to all of the stations.

To this end, the vehicle 10 sends, for example the day before the journey, preferably via a cell phone network, in particular a GSM network, a reservation request DEM. The emitter of the vehicle used may in particular be a cell phone, for example belonging to the driver of the vehicle, or a telephone integrated into the vehicle 10.

The reservation request DEM may in particular comprise information VEH relating to the vehicle, and set constraints for the recharging, and in particular a constraint GEO defining the geographical location in which the vehicle desires to proceed with the recharge of its batteries, and a constraint HOR defining the time at which it is desired to proceed with the recharge of its batteries.

VEH preferably comprises an identifier ID-Veh of the vehicle, but also, preferably, information relating to technical characteristics of the vehicle, such as the nature and the capacity of its batteries.

GEO may for example be the identification of a particular station, but also a town or geographical coordinates defining a geographical sector in which the vehicle desires to carry out the recharge of its batteries.

HOR may be a date, a charging start time or a recharge timeslot. For example, the vehicle may request a recharge "as soon as possible".

Optionally, the reservation request DEM may also contain a constraint relating to the level of charge LEV_strt of the batteries at the time at which the vehicle 10 will arrive at the station 12. This constraint may for example be obtained by indicating the current level of charge, the trips that are expected be made before the recharge and/or the remaining capacity of the batteries of the vehicle.

Optionally, the reservation request DEM may also comprise a constraint relating to the level of charge LEV_end that the vehicle desires to reach the end of the recharge. For example, the reservation request may indicate that the vehicle desires a complete recharge of its batteries or a recharge that will allow it to drive a minimum number of kilometers.

In step a2), the center 14 then processes the reservation request DEM.

More precisely, the center 14 manages a schedule 16. The center 14 searches for a station 12 likely to satisfy the reservation request, i.e. one in particular located at a location compatible with the reservation request and capable of delivering the requested power in the desired timeslot.

If the vehicle has not indicated a particular station, the center 14 searches for a station that best satisfies the reservation request. The station selected in particular depends on the geographical constraints set and on the ability to deliver the desired power in the desired timeslots. If the center 14 is unable to find a station that is perfectly compatible with the request, the center 14 engages in a dialogue with the vehicle 10 in order to determine whether certain constraints of the reservation request may be modified. For example, the center 14 may suggest a station that is not in the desired geographical perimeter, but that is close thereto. Likewise, the center 14 may suggest a timeslot different from the one desired, or suggest a partial recharge of the batteries.

Once it has identified a charging station that is acceptable to the vehicle 10, the center 14 sends a positive response REP to the vehicle.

The response in particular comprises access data ACC, which data are required to gain access to the station, and in particular an access code.

In one embodiment, the center 14 and the station 12 are initially programmed so that an access code is generated on each reservation request (running code) by the center 14, and so that the station 12 is able to check that the access code received from a vehicle 10 is indeed a code generated by the center 14.

The access data also comprise information on the selected station, for example information relating to the identification and/or location of the station and/or to conditions specific to the station (for example the need to open a gate to access the station) and to the timeslot in which the vehicle 10 will be able to access the station.

In one embodiment, the response of the center 14 to the vehicle 10 also comprises information on other requests to reserve the station 12, in particular immediately before and/or after the timeslot assigned to the vehicle 10. The owner of the vehicle 10 may therefore act accordingly and, for example, seek not to arrive at the station 12 before the timeslot assigned thereto, or even decide to leave his vehicle at the station 12 once the charging has finished.

In one preferred embodiment, the center 14 informs the vehicle 10, preferably in real time, of any modification to the schedule relating to the station 12, in particular when another vehicle has reserved a timeslot immediately before or immediately after that of the vehicle 10.

If the center 14 notes that the reservation request was made by a vehicle 10 that is not subscribed to the service, or if the center 14 is unable to find a station satisfying the request, even after it has been modified following dialogue with the vehicle, the center 14 sends a negative response NEG to the vehicle 10, in order to inform it of the failure.

In step b), the vehicle 10 arrives in proximity to the selected station 12. It sends, to the station 12, the access data ACC. The access data in particular comprise the access code, which the station 12 analyses in order to determine the validity of the access code, but also, preferably, the timeslot and/or the time for which the station must allow electrical power to be accessed.

According to the invention, the exchanges between the vehicle 10 and the station 12 are carried out by means of an autonomous wireless communication, i.e. one that does not require other means, such as a satellite or telephonic relay, to be employed. In other words, the vehicle 10 and the station 12 are able to dialogue, even in an isolated environment, or in an un-served zone.

In one preferred embodiment, the local electromagnetic communication used is possible when the vehicle is at more than 0.5 m, preferably more than 1 m, and preferably more than 5 m from the station. In particular, the local electromagnetic communication used is preferably not a communication of the near-field-communication (NFC) type.

Preferably, the local electromagnetic communication is at a frequency comprised between 2400 and 2500 MHz or between 5000 and 6000 MHz, and preferably is a Bluetooth® or Wi-Fi communication.

The local electromagnetic communication may also involve light waves and preferably is a Light-Fidelity (Li-Fi) communication, preferably with transmission of waves having a wavelength comprised between 480 nm and 650 nm.

The local electromagnetic communication may also combine a plurality of types of communication, for example Wi-Fi/Bluetooth®.

Among all the different types of communications, a Bluetooth® communication is preferred.

If the station validates the access request, it allows access to the electrical power provided via a socket of the station. It may for example close a circuit in order to supply the socket with power electrically. Preferably, the socket is permanently supplied with power and the accessibility results from a barrier blocking access to the socket being opened. For example, a flap may open.

In one embodiment, access is enabled in particular by opening a gate or a barrier, this in particular being useful to limit access to the home of an individual.

The vehicle 10 may then connect to the socket, in order to recharge its batteries.

In one preferred embodiment, the access data set or allow the station to set not only a charging start time, but also an end time. Advantageously, the center 14 may thus manage "in advance" reservation requests by other vehicles desiring to use the station 12.

If, in response to the access request ACC, the vehicle 10 receives no response or receives an access denial (REF), it informs the center 14 of this once communication is possible.

The center 14 may then carry out a diagnosis and/or contact the owner of the station 12 in order to check that it is working correctly.

In step c), which is optional, for example in the five minutes, and preferably in the minute, that follows the charging phase, and more preferably immediately after the charging, or even before the end of the charging, the station 12 transmits, to the vehicle 10, charging data CHA, preferably via Bluetooth®.

The charging data in particular include information on charging conditions, for example on the start time and the end time of the charging, on the amount of power that the vehicle consumed charging, or on particular problems, such as an interruption of the power supply.

In one preferred embodiment, the charging data also include one or more images, for example photos or films, of the vehicle 10 and/or of one or more vehicles that were present, before the vehicle 10, in the charging space, i.e. the location in which a vehicle must be to be recharged by the station 12. Preferably, these images acquired by the station 12 at regular intervals and/or when a vehicle 10 has requested access to electrical power.

The charging data are recorded in the vehicle 10.

In step d), which is optional, the vehicle 10 transmits, to the center 14, all or some of the charging data CHA. Preferably, the transmission is carried out as soon as it is possible, i.e. once the vehicle is able to communicate with the center 14, preferably via a cell phone network, a GSM network for example. The center 14 may in particular use the charging data CHA to bill the vehicle 10 and to remunerate the owner of the station 12.

When the charging data comprise images, the center 14 may also check that the vehicle 10 that was recharged is indeed the one that was expected and/or that the recharging space has not been being used inappropriately, for example by non-electric vehicles.

The center may also exploit the images for statistical purposes, in particular in order to decide to modify access to the charging space. For example, if the center notes that the charging space is often occupied by non-electric vehicles, it may decide to add a barrier (which is preferably controlled by the station) allowing the charging space to be accessed only by authorized vehicles.

Moreover, the station 12 may transmit, to the vehicle 10, complementary information COM, so that the vehicle 10 may inform the center 14 thereof. The complementary data may in particular comprise information relating to the operation of the station 12, and in particular relating to whether or not it is operating correctly.

As should be clearer now, a method according to the invention advantageously allows a vehicle to reserve a station, using a cell phone communication network, then to access this station without either the vehicle, or the station having any need to consult the center 14.

This method advantageously uses a cell phone network to establish the dialogue between the vehicle and the center, and a local network, of Bluetooth® type, to establish the dialogue between the vehicle and the station. This method is therefore particularly flexible.

The invention is not however limited to the embodiments that have just been described.

In particular, in another embodiment, no information on the access times is delivered to the vehicle 10. The latter receives only an access code capable of being accepted by the station 12 and may turn up at the station 12 at any time. Preferably, if access to the station 12 is not immediately possible, the station 12 however informs the vehicle thereof, preferably by indicating thereto the time from which it will be possible to access the station. The station 12 does not however manage the timeslots in which it is accessible. There is therefore a risk that a vehicle other than the scheduled one will turn up at the station 12. This embodiment is therefore not preferred.

In one particular embodiment, the access data ACC provide access to the station 12 without limiting the duration of this access. The station 12 is then inaccessible until the center 14 receives charging data CHA informing it of the end of the recharging of the vehicle 10. The center 14 uses the charging data to update the schedule. No reservation of the station 12 is then possible until the station 12 is free. This embodiment is also not preferred.

Figure 3:
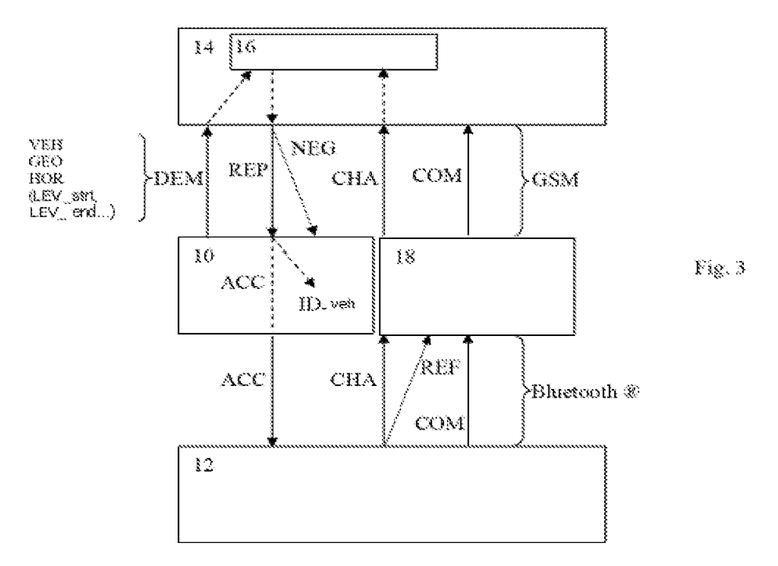

Moreover, in step c), the charging data CHA and/or the complementary information COM may be transmitted, by the station, to another vehicle 18 (FIG. 3), in particular to a vehicle 18 that turns up subsequently at the station. It is then the vehicle 18 that, in step d), transmits, to the center 10, all or some of the charging data CHA or complementary information COM, this being particularly advantageous when the vehicle 10 is unable to perform this transmission, for example because the battery of the cell phone of the driver of the vehicle 10 has run out.

Charging Station

The invention also relates to an electrical charging station comprising:

a socket 20 intended to be supplied with power by the mains grid and to deliver electrical power to an electric vehicle;

a casing 22 intended to be fastened to the ground or to a wall;

a holder 24 in or into which the socket is fastened or integrated, said holder being movable with respect to the casing between a protected position and an exposed position, in which positions access to the socket is permitted (open) and prevented (closed), respectively;

means 26 for driving the holder between the protected and exposed positions;

a control module 27 for controlling the driving means.

The socket 20 may consist of any conventional socket suitable for recharging electric vehicles. In the shown embodiment, the socket 20 is integrated into a holder 24 of hemispherical general shape of axis Y.

The casing 22 may be made of a polymer material, of polycarbonate for example.

Preferably, the casing is intended to be located above ground, i.e. to not be buried.

It comprises, in the shown embodiment, a fastening plate 28 intended to be rigidly fastened to a wall, for example by means of screws, and a dome-shaped cover 30 to which the fastening plate may be fastened. The cover 30 has a first aperture 32 and a second aperture 34, of axis Y.

The fastening plate 28 is removably fastened, and for example screwed, to the cover 30, so as to block a first aperture 32 of the cover 30. The fastening plate comprises an orifice 29 through which a power cable 31 for supplying power to the electrical socket 20 may exit from the cover 30.

Preferably, the holder 24 is rotatable, in the casing, about an axis X, between a protected position and an exposed position.

Preferably, the axis X passes substantially through the center of the holder. More preferably, the general shape of the exterior surface of the holder is of revolution about the axis X. Preferably, the general shape of the exterior surface of the holder is cylindrical of axis X or is the shape of a sphere, the axis X passing through the center of said sphere.

The distance between the axis X and the aperture 34 is preferably larger than 3 cm, than 4 cm, than 5 cm or than 6 cm and/or smaller than 10 cm.

In one embodiment, the axis X cuts the axis Y and is perpendicular thereto.

The holder 24 is preferably arranged so as to block the second aperture 34 whatever the angular position of the holder with respect to the casing. The content of the cover is thus always isolated from the exterior environment, and in particular from bad weather.

The holder 24 may in particular have a general shape that is substantially complementary to the general shape of the casing, at least locally around the second aperture 34. For example, the holder 24 may be cylindrical or spherical if the casing is cylindrical or spherical in proximity to the second aperture 34.

More preferably, in protected position, the socket 20 is separated from the exterior environment by a shield for protecting against shocks, which is preferably formed by the holder 24.

The shield may be made of a material that is plastically or elastically deformable, for example of ABS, of PVC or of polycarbonate. An elastic deformation advantageously allows the shield to regain its shape after a shock, this limiting maintenance.

The shield may comprise rigidity-increasing ribs.

Preferably, in the protected position, the socket is separated from the exterior surface 23 of the casing, i.e. the surface which is exposed to the environment when the casing is fastened to the wall or to the ground, by a distance larger than 2 cm, preferably larger than 5 cm, preferably larger than 7 cm, and preferably larger than 10 cm. The shield may have a thickness larger than 0.5 cm, preferably larger than 1 cm, and more preferably larger than 2 cm.

In one preferred embodiment, as shown, the shield lies, at least partially, opposite the socket with respect to the axis of rotation of the holder. The protection is maximized thereby.

Preferably, an operational unit different from the socket 20 is fastened to the holder. Preferably, the holder is movable between
- the protected position,
- the exposed position, and
- at least one operational position, different from the exposed position, in which access, via the aperture 34, to said operational unit is possible, that is to say, in which the operational unit can be used.

The operational unit may for example be an image-acquiring apparatus, a bicycle or motorcycle anti-theft device, a second socket suitable for delivering an electrical current different from that of the socket 20, and for example suitable for delivering an electrical current for recharging an electrical motorcycle or a bicycle, a compartment, a safe, in which keys, for example automobile keys, may be placed, a keyboard, for example allowing an identifier or an access code to be input, a screen, in particular a touchscreen, or a communication station equipped with an antenna, for example for a communication of RFID or NFC type.

The station thus allows secure access, for example to keys, or to an access code. It may thus in particular be used when the vehicle is self-service, each user for example being able to collect the keys from the safe of the station, then, after having used the vehicle, to return them to the safe of the station or of another station.

The keys may each be equipped with a transponder so that the station is able to detect the presence or absence of keys in the safe. Advantageously, it is thus possible to identify the time at which the keys were extracted from the safe and/or returned to the safe.

Preferably, the operational unit is controlled by the control module. For example, the control module allows the acquisition of an image with the image-acquiring apparatus to be triggered and/or controls the locking and/or unlocking of the anti-theft device and/or controls the delivery of electrical power by the second socket and/or controls the locking and/or unlocking of the safe and/or controls the interactions with the keyboard or with the touchscreen or the communication station.

Preferably, the holder is movable between at least two operational positions in which access, via the aperture 34, to respective operational units fastened to the holder is permitted. Preferably, in an operational position in which access, via the aperture 34, to an operational unit is permitted, access, via said aperture 34, to another operational unit, and preferably to any other operational unit, is prevented.

Preferably, in the exposed position, in the protected position, and in any one of the operational positions, the blockage of the aperture 34 prevents rain from getting into the casing, between the edge of the aperture 34 and the holder.

The operational positions are preferably predefined.

More preferably, in the protected position, access, via the aperture 34, to any operational unit is prevented. Advantageously, the protected position thus allows all the operational units to be protected, in particular from vandalism. The cylindrical or spherical shape of the holder is particularly suitable for this.

An operational unit may, in particular, be an image-acquiring apparatus 35, for example a still camera or a video camera fastened to the holder 24. Depending on the angular position of the holder, the image-acquiring apparatus is thus movable between an operational position, or "image-acquiring position", in which it is able to acquire an image through the second aperture 34, and a stowed position, in which it is protected in the interior of the casing 22.

Preferably, the image-acquiring apparatus 35 is provided with a spectral analysis software package. Preferably, it is equipped with an infrared camera.

Preferably, the image-acquiring apparatus 35 is provided with a software package for analyzing the acquired images, said software package being suitable for identifying the brand and/or the type of vehicle contained in the acquired images. Preferably, in the stowed position of the acquiring apparatus, the socket is in its protected position.

The driving means 26 conventionally comprise a motor 36, which is preferably electric, and a set of transmitting members, such as a worm screw 38, coupled to the motor 36, and a cog 40 of axis X coupled to the worm screw and rigidly fastened to the holder 24.

Preferably, the control module 27 is configured to control the driving means 26 so as to move each operational unit between its respective operational position and its respective stowed positions, in which positions the operational unit is exposed to and isolated from the environment outside the casing, respectively. In the operational and stowed positions, access to the operational unit, via the aperture 24, is therefore permitted and prevented, respectively.

Preferably, the control means 27 are configured to permit the holder to be positioned with respect to the casing only in the protected and exposed positions, or, when the holder bears one or more operational units, to permit the holder to be positioned with respect to the casing only in the protected, exposed, operational and stowed positions.

The control module 27 is preferably configured to control the driving means 26 so as to move the operational unit exclusively between predefined positions. The number of predefined positions is preferably lower than 10, preferably lower than 8, preferably lower than 6, preferably lower than 5, and/or higher than 2, and preferably higher than 3.

The control module 27 comprises a transceiver able to dialogue with the vehicle 10, preferably via Bluetooth®, and a processor configured so as to control the driving means 26 depending on said dialogue and, preferably, to control the operation of the operational units, and in particular the trigger of the image-acquiring apparatus 35.

The way in which the charging station works may be deduced directly from the above description.

Figure 2A:
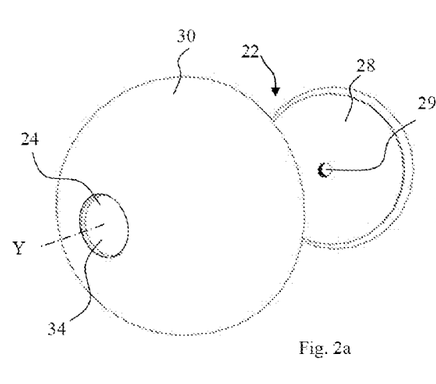
Figure 2B:
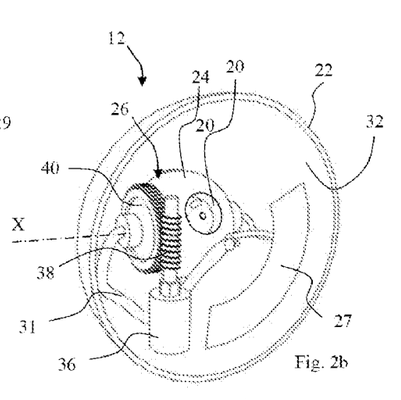

Initially, the holder 24 is in the protected position, which is shown in FIGS. 2a and 2b. The exterior surface of the holder, which lies opposite the socket 20 with respect to the axis X, blocks the second aperture 34. The socket and the optional image-acquiring apparatus are therefore isolated from the exterior environment, and in particular from bad weather. The image-acquiring apparatus 35 is moreover advantageously protected from vandalism, and in particular a spray of paint.

Furthermore, in case of shock on the cover 30, the socket and the optional image-acquiring apparatus are well protected. In particular, the socket is advantageously located away from the exterior surface 23 of the cover 30.

Lastly, no access to the electrical current available via the socket 20 is possible from outside the cover 30.

Figure 2C:
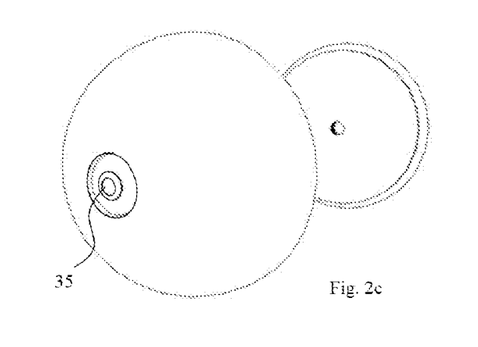

At regular intervals, the control module activates the motor 36 so as to drive the holder 24 to rotate about the axis X, to the acquisition position, in the present case via a rotation of +90°. The objective of the acquiring apparatus then faces the second aperture 34, preferably in such a way as to lie flush therewith, i.e. so as to not protrude therefrom (FIG. 2c).

The control module then triggers the acquisition of at least one image. Preferably, the station 12 is arranged so that the image contains a license plate of a vehicle potentially present in the charging space.

Figure 2D:
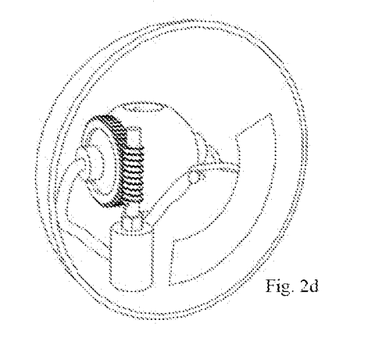

Preferably, once the image has been acquired, the control module activates the motor 36 so as to drive the holder 24 to rotate about the axis X to the stowed position, in the present case via a rotation of −90° or of +270°. The objective of the acquiring apparatus then no longer faces the second aperture 34 and is therefore no longer exposed to the environment outside the casing.

Figure 2E:
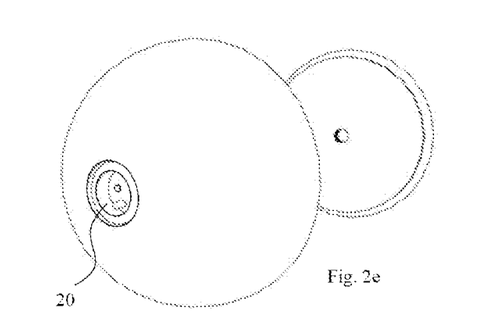
Figure 2F:
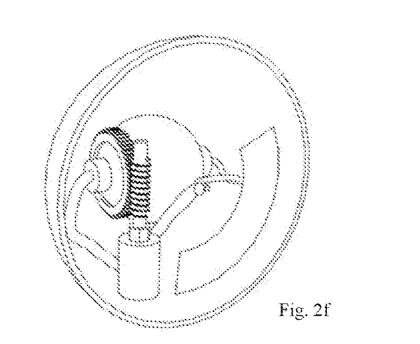

Following the dialogue with the vehicle, the control module activates the motor 36 so as to drive the holder 24 to rotate about the axis X to the exposed position (FIGS. 2e and 2f). The socket is then accessible through the second aperture 34. Preferably, it lies flush with the second aperture 34 and, more preferably, blocks it. Preferably, it does not protrude from the second aperture 34, this limiting the risk of degradation.

The vehicle may therefore access electrical power in order to recharge.

Prior to the rotation of the carrier to the exposed position, the control module 27 preferably commands the acquisition of an image in order to identify the vehicle 10. Preferably, it operates the motor 36 until the acquiring apparatus reaches the acquisition position, triggers the acquisition of the image, then operates the motor 36 until the socket reaches the exposed position.

At the end of recharging, the control module once again activates the motor 36 so as to drive the holder 24 to rotate about the axis X to the initial protected position.

As should now be clear, a charging station according to the invention allows access to the socket to be restricted, while protecting the socket when it is not being used.

More preferably, a charging station according to the invention allows an image to be acquired and said image to be transmitted to the center via the vehicle, just like the charging data. More precisely, the image is sent via the local communication network, and preferably via Bluetooth®, to the vehicle, and the latter retransmits it to the center 14 when it has access to a cell phone network, and in particular a GSM network.

A charging station according to the invention is therefore well suited to being installed in someone's home, and with access possible from the street. It is effective even if the station has not subscribed to a cell phone network or is in an un-served zone and can therefore not access such a network.

The invention also relates to a device comprising more than 10 or more than 100 spaces for vehicles, for example a parking lot, in particular a covered parking lot, each space being provided with one charging station according to the invention, the device comprising:
    means for detecting a vehicle, for example a vehicle entering into the parking lot, and
    means for indicating a space to the driver of said vehicle, in particular so that he parks there, in communication with said detecting means.

The detecting means may in particular comprise a camera provided with an image-analyzing software package suitable for detecting, in an image acquired by the camera, a vehicle, and preferably able to identify the type of vehicle contained in said acquired image and/or an identifier of said vehicle. In one embodiment, these means are integrated into at least one charging station according to the invention.

The means for indicating a space to the driver of said vehicle are in communication with the detecting means. They preferably comprise a software package suitable for
    receiving a request from the detecting means to search for a space for a detected vehicle,
    accordingly searching for a space, in particular a free space suitable for the detected vehicle, the search preferably depending on an identifier of the detected vehicle,
    after having found a space, controlling an indicator integrated into the charging station of the found space.

The indicator may be a luminous or an audio indicator. It may in particular be suitable for emitting a voice message, music or an alarm.

In one embodiment, the indicating means are integrated into at least one charging station according to the invention.

In one embodiment, the indicator is activated only when the vehicle is approaching the charging station, for example when it is at less than 100 m, or even at less than 50 m or at less than 10 m from the charging station.

The spaces are not necessarily in a parking lot. They may for example be dispersed through a town.

Of course, the invention is not limited to the embodiments described and shown, which have been provided solely for the purposes of illustration.

The invention claimed is:

1. Method for exploiting a network of stations intended to recharge with electrical power a set of motor vehicles, the method comprising the following successive steps:
    a) a step in which a reservation is made, with a first vehicle, via a reservation center, by carrying out the following steps:
        a1) a step in which the first vehicle makes a reservation request, to the reservation center, the reservation request setting constraints;
        a2) a step in which the reservation center checks, in a schedule, the availability of a station meeting said constraints;
        a3) if a station meeting the constraints is available, a step in which the reservation center transmits, to the first vehicle, a positive response comprising access data that permit access to the station, updates the schedule and records the access data in a memory of the first vehicle; otherwise preferably, the reservation center transmits, to the first vehicle, a negative response to the reservation request;
    b) if the first vehicle has received a positive response to the reservation request, when the first vehicle is less than 100 meters from the station, a step in which the first vehicle requests access to the station, the access request comprising the following successive steps:
        b1) a step in which the first vehicle transmits the access data to the station;
        b2) a step in which the station checks the access data;
        b3) if the access data are correct, a step in which the station provides access to the electrical power available via a socket of the station; otherwise, the station transmits an access denial to the first vehicle, the communication between the first vehicle and the station being a local electromagnetic communication, only possible when the first vehicle is less than 100 m from the station;

c) at the end of charging, a step in which the station transmits charging data to the first vehicle or to a second vehicle, and in which the charging data are stored in the memory of said first vehicle or in a memory of the second vehicle, respectively;

d) a step in which charging data are transmitted from the first or second vehicle, respectively, to the reservation center, and in which a central database is updated with the charging data.

2. Method according to claim 1, wherein the local electromagnetic communication is at a frequency comprised between 2400 and 2500 MHz.

3. Method according to claim 1, wherein the local electromagnetic communication is a Bluetooth® communication.

4. Method according to claim 1, wherein, in step a), the reservation of the station via the reservation center is carried out by means of a cell phone network.

5. Method according to claim 1, wherein the station is located in an un-served zone not covered by a cell phone network.

6. Method according to claim 1, wherein the network of stations comprises more than 5000 stations.

7. Method according to claim 1, wherein, in step a), the identification of a station to satisfy the reservation request depends on a constraint relating to the geographical location of the station, and on a constraint relating to the time at which the battery of the first vehicle is to be recharged.

8. Method according to claim 7, wherein the identification of a station to satisfy the reservation request further depends on a constraint relating to a level of charge that the batteries of the first vehicle will have at the time at which the reservation center believes the first vehicle will arrive at the station, and/or a constraint relating to a level of charge requested by the first vehicle at the end of the recharging.

9. Method according to claim 1, wherein, in step a), if the reservation center is unable to find a station satisfying the reservation request, the center proposes modifications to at least one constraint set by the reservation request.

10. Method according to claim 1, wherein the reservation center generates an access code on each reservation request, and the station is configured to inspect the validity of the access code received from the first vehicle.

11. Method according to claim 1, wherein the reservation center informs the first vehicle of other requests to reserve the station reserved by the first vehicle.

12. Method according to claim 1, wherein the local electromagnetic communication used is possible when the first vehicle is at more than 0.5 m from the station.

13. Method according to claim 1, wherein the charging data comprise an image acquired by the charging station.

* * * * *